United States Patent Office 3,060,097
Patented Oct. 23, 1962

3,060,097
SKIN BLEACHING COMPOSITION
Walter Fellows, 25 W. Ontario St., Chicago 10, Ill.
No Drawing. Filed Mar. 15, 1957, Ser. No. 646,501
6 Claims. (Cl. 167—91)

This invention relates to a preparation for bleaching the skin of living creatures, both human and animal. It has for one object to provide safe and effective bleaching material for use in bleaching pigmented and particularly over-pigmented portions of the skin.

Another object of the invention is to provide means for bleaching the skin for the removal of generally darker spots or areas, such as freckles, so-called liver spots, and the like.

Another object is to provide a method of bleaching which includes the use of the material disclosed.

A further object is to provide a material and a method of its use by means of which bleaching of the skin is carried out without damage to the skin, and without any other unsatisfactory or damaging results.

Other objects will appear from time to time throughout the specification and claims.

The bleach of the invention comprises a mixture of the following ingredients:

(1) A material capable of modifying the human or animal skin;
(2) A material capable of bleaching the pigment of human or animal skin;
(3) A penetrant and soothing unguent;
(4) A solvent and a penetrant.

All of these materials act without damage to the skin, human or animal.

In general, although the invention is not limited to the particular materials now listed, satisfactory results have been accomplished by the use of a bleach which includes the following materials:

(a) As the material for modifying the skin, monobenzyl ether of hydroquinone is used;

(b) As the bleach for bleaching the pigment of the skin, sodium hypochlorite is used. It is preferably in the form of the commercial preparation sold under the trade name Clorox in which sodium hypochlorite is present in solution to the extent of 5.25 percent by weight, and the remainder is water;

(c) As the penetrant and soothing unguent, a lanolin compound is used. This is preferably a product now available under the trade name of Aquaphor. This material is defined as:

"An absorption base containing as its active hydrophilic ingredient, six parts of a group of alcohol of cholesterols obtained from wool fat by saponification and selective extraction processes of the nonsaponifiable part, and ninety-four parts of aliphatic hydrocarbons."

In general, therefore, the penetrant and soothing unguent used comprise a refined hydrophilic form of lanolin together with aliphatic hydrocarbons. Where in the specification and claims the expression "lanolin" is used, it is to be understood as referring to this material.

(d) As the solvent and penetrant, normal octyl acetate, amyl acetate, ethyl acetate or diethyl phthalate may be used.

The bleaching material as a whole is prepared as a mixture of the ingredients above listed, and these may be mixed in various proportions. However mixed, and whatever the proportions, the bleaching material as a whole is applied to the skin to be bleached daily. It is kept in position on the skin from eight to ten hours of each day, being covered by a generally waterproof covering which prevents the material from escaping through it. The covering is preferably airtight and skintight as applied.

After the material has been on the skin for eight to ten hours, it is removed, normally by wiping, then washing with soap and hot water. Lanolin or equivalent material is applied to the area under treatment, and this may also be covered until the next application of the bleaching material, the lanolin being removed by wiping off, then washing with soap and hot water before the reapplication of the bleach.

The treatment just mentioned, including the daily application of the bleach, its removal after the required period, and the application thereafter of lanolin, is repeated, preferably daily, for a period of two to three weeks. Thereafter, for a period of several days, if desired or necessary, the general bleaching material may be applied again daily but the proportions may be varied. The relative proportion of the bleach, such as the sodium hypochlorite, will, in the case of the second bleach, be present in increased proportion with respect to the other ingredients.

One suitable composition for the first bleaching treatment is formed by mixing:

4 ounces of monobenzyl ether of hydroquinone
2 fluid ounces of normal octyl acetate or equivalent
4 ounces lanolin
1¼ fluid ounces sodium hypochlorite This is compounded by mixing first the monobenzyl ether of hydroquinone with the normal octyl acetate or equivalent; thereafter, adding the lanolin to the mixture, and finally adding the sodium hypochlorite. The sodium hypochlorite is preferably added shortly before the product is to be used. Since the sodium hypochlorite tends to lose potency in the mixture, it should not be mixed with the other ingredients until the compound is ready to be used, and after this complete mixture of Clorox and the rest of the compound is a week old, it is preferably discarded and a new batch made with fresh Clorox. This mixture, so compounded, is preferably used for the first stage of the treatment, which, as stated, may comprise daily treatments for approximately three weeks.

The material which is used in the second or succeeding treatment is compounded by the same steps and comprises, preferably, the ingredients in the following proportions:

4 ounces of monobenzyl ether of hydroquinone
2 fluid ounces of normal octyl acetate or equivalent
4 ounces lanolin
4 fluid ounces sodium hypochlorite This material, after mixture, is applied to the skin daily; is allowed to remain in place for eight to ten hours; and is then removed, preferably by wiping, then washing with soap and hot water. After its removal, some lanolin or comparable penetrant and soothing material may be used by application to the area under treatment and remains until the next daily treatment, when it is wiped off, then washed with soap and hot water.

The bleaching mixture or material, according to the second set of proportions above listed, differs from the first only by the fact that the bleach itself, the sodium hypochlorite, which is the material capable of bleaching the pigment of the skin, is increased in relation to the other ingredients. Except for that change, the two formulae are the same as to ingredients and as to percentages of ingredients, and as to the manner of compounding.

The above-mentioned formula, if desired, may be used all the way through the bleaching treatment without increasing the proportion of Clorox (4 ounces). In other words, the first-mentioned formula with the Clorox of 1¼ ounces need not be used at all. The treatment may be started and carried through to the end with the formula containing 4 ounces of Clorox. In some cases, if the skin of the subject is unduly thin and tender, the first-mentioned formula containing 1¼ ounces of Clorox may be used all the way through, with no increase in the Clorox toward the end.

The ingredients of the mixture generally interact with each other. The normal octyl acetate, or equivalent, mixes with and dissolves the monobenzyl ether of hydroquinone. As thus mixed, the monobenzyl ether of hydroquinone is prevented or retarded from combining with or effecting the bleaching power of the sodium hypochlorite, which is thus free to carry out its bleaching effect on the pigment of the skin. The lanolin mixes with the entire masses of materials and forms a homogeneous mixture of materials and prevents separation of the sodium hypochlorite and the monobenzyl ether of hydroquinone. The normal octyl acetate mixes with the lanolin to form a penetrant. Where normal octyl acetate is referred to this expression is to be understood as including the equivalent substances amyl acetate, ethyl acetate and diethyl phthalate.

When the material is applied to the skin, the monobenzyl ether of hydroquinone operates on the pigment cells to prevent the formation by them of the protective substance which they normally form and which prevents bleaching. When this formation of the protective substance is prevented, the nascent oxygen in the sodium hypochlorite is able to combine with and to oxidize the pigment present in the skin and thus the pigment is bleached. The ingredients of the mixture, although they perform separate functions, also perform functions together. One material prepares the skin pigment for bleaching action by another.

While the formulae above given are satisfactory and may even be considered as representing the preferable formulae, substantial variations of proportions of the ingredients are possible. Such permissible variations are set forth in the following table:

Monobenzyl ether of hydroquinone—from ½ ounce to 6 ounces.
Normal octyl acetate (or equivalent)—from ¼ fluid ounce to 4 fluid ounces, or none.
Lanolin—from 3 ounces to 8 ounces, or none.
Sodium hypochlorite—from 1.25 ounces to 8 ounces.

Generally, within the range of the preferred formulae only one ingredient in a given batch of material will be varied or should be varied from the maximum to the minimum, although any or all may be varied.

In the first example given above, in which sodium hypochlorite is present in the amount of 1¼ ounces, it would be possible to vary the formulation by varying the sodium hypochlorite from 1.25 ounces to 8 ounces without varying the proportions of any of the other ingredients. If desired, however, the other ingredients may be varied within the ranges indicated in the table above, but in any one batch of the compound only one ingredient may be varied from its minimum to its maximum proportion, but the proportions of all the ingredients may be varied slightly in the same batch.

The limits between which the sodium hypochlorite may be varied, as above set out, namely from 1.25 ounces to 8 ounces, are the limits within which it is preferable to vary the sodium hypochlorite. However, it has been found that with certain skins a somewhat wider range of variations is possible, although rarely preferable. Thus, approximately ½ ounce of sodium hypochlorite may be present in a mixture in which the other ingredients comprise 10 ounces and in this proportion satisfactory results are produced with certain skins. In the copending application, Serial No. 402,589, filed January 6, 1954, of which the present is a continuation-in-part, these are the proportions expressed in the first example, in which example the minimum quantity of sodium hypochlorite was included.

There are some skins so sensitive or susceptible to the action of the monobenzyl ether of hydroquinone that after two or three weeks of application they have lost, if not permanently at least for a long while, the power to rebuild or to reproduce the protective agent. Therefore, where such skins are observed after a period of treatment, which may be two or three weeks, and when it is established that they have lost this power to reproduce the protective agent, a compound made of all the ingredients listed in the preferred formula, minus the Clorox, is applied for two or three weeks (or any suitable period). During this time no effort is made to bleach the skin. The formula is applied solely for the purpose of having the monobenzyl ether of hydroquinone affect the pigment cells and prevent their forming the antibleach protective substance. At the end of this more or less prolonged period, the pigment cells of some skins may be so profoundly affected by the daily application of the monobenzyl ether of hydroquinone that even after the applications have been discontinued, it may be about a week before the pigment cells recover sufficiently to re-form that protective substance. If, within that week, Clorox without monobenzyl ether is applied to the skin, the skin will be bleached after a few days' application. This last formula may be in the following form:

3 fluid ounces of normal octyl acetate or equivalent.
7 ounces Aquaphor.
4 fluid ounces Clorox.

It is more convenient to follow the above procedure, since during the three weeks' application of the monobenzyl ether of hydroquinone compound the skin need not be covered tightly, only in such a manner as to prevent the accidental wiping off of the compound. This method may be used only on exceptional skins.

This application is a continuation-in-part of my application Serial No. 402,589, filed January 6, 1954, and of my application Serial No. 200,315, filed December 8, 1950. The said applications have been abandoned and the subject matter thereof has been continued in the present application.

I claim:

1. The composition comprising monobenzyl ether of hydroquinone, an ingredient selected from the class consisting of normal octyl acetate, amyl acetate, ethyl acetate, and diethyl phthalate, refined hydrophilic lanolin and a 5.25 percent aqueous solution of sodium hypochlorite, the composition containing about 4 fluid ounces of said aqueous solution of sodium hypochlorite and about 10 weight ounces of the other ingredients.

2. The composition comprising monobenzyl ether of hydroquinone, normal octyl acetate, refined hydrophilic lanolin and a 5.25 percent aqueous solution of sodium hypochlorite, the composition containing about 1¼ fluid ounces to about 8 fluid ounces of said aqueous solution of sodium hypochlorite and about 10 weight ounces of the other ingredients.

3. The composition comprising from about ½ weight ounce to about 6 weight ounces of monobenzyl ether of hydroquinone, from about ¼ fluid ounce to about 4 fluid ounces of normal octyl acetate, from about 3 weight ounces to about 8 weight ounces of an unguent containing about 6 percent of refined hydrophilic lanolin and from about 1¼ fluid ounces to about 8 fluid ounces of a 5.25 percent aqueous solution of sodium hypochlorite.

4. A composition comprising from about ½ weight ounce to about 6 weight ounces of monobenzyl ether of hydroquinone, and from about 1¼ fluid ounces to about 8 fluid ounces of a 5.25 percent aqueous solution of sodium hypochlorite.

5. The composition comprising monobenzyl ether of hydroquinone, normal octyl acetate, refined hydrophilic lanolin and a 5.25 percent aqueous solution of sodium hypochlorite, said composition containing about ½ fluid ounce of said aqueous solution of sodium hpyochlorite and about 10 weight ounces of the other ingredients.

6. The method of bleaching the skin which includes the steps of applying thereto a composition comprising sodium hypochlorite, monobenzyl ether of hydroquinone, normal octyl acetate and refined hydrophilic lanolin, tightly covering the composition when present on the skin with a flexible air-impervious coating material, causing the ingredients to remain in contact with the skin for a substantial period of time, removing the ingredients, then applying refined hydrophilic lanolin, thereafter leaving the skin untreated for a substantial period of time, removing the lanolin, repeating the application of the sodium hypochlorite, and alternating the steps indicated for a period of weeks.

References Cited in the file of this patent

UNITED STATES PATENTS

| | | |
|---|---|---|
| 1,612,742 | Putt | Dec. 28, 1926 |
| 2,041,264 | Collins | May 19, 1936 |

OTHER REFERENCES

Gershenfeld: Am. J. of Pharmacy, July 1940, page 283.

Schwartz and Peck: Cosmetics and Dermatitis, 1946, page 62.

Denton et al.: J. Inv. Derm., vol. 18, No. 2, February 1952, pages 119–122, 128, 132–133.

Davison: Synopsis of Materia Medica Toxicology and Pharmacy, 3rd Ed., Mosby Co., St. Louis, Mo., 1944, page 168.